United States Patent [19]

Kubo

[11] Patent Number: 5,026,420

[45] Date of Patent: Jun. 25, 1991

[54] PURIFICATION PROCESS FOR GOLD-BEARING IODINE LIXIVIANT

[76] Inventor: Susumu Kubo, 101 Chuo Apartment, 849 Zyouzankei, Minami-ku, Sapporo City, Hokkaido, Japan

[21] Appl. No.: 515,496

[22] Filed: May 1, 1990

[30] Foreign Application Priority Data

May 12, 1989 [JP] Japan .................................. 1-117376

[51] Int. Cl.⁵ ............................................ C22B 11/04
[52] U.S. Cl. ............................................... 75/712
[58] Field of Search ........................................ 75/712

[56] References Cited

U.S. PATENT DOCUMENTS

| 2,304,823 | 12/1942 | Harrison | 75/118 |
| 3,957,505 | 5/1976 | Homick | 75/108 |
| 4,557,759 | 12/1985 | McGrew et al. | 75/118 |
| 4,734,171 | 3/1988 | Murphy | 204/111 |

Primary Examiner—Peter D. Rosenberg
Attorney, Agent, or Firm—Sheridan, Ross & McIntosh

[57] ABSTRACT

A process for purifying gold-bearing iodine lixiviant characterized by bringing the gold-bearing lixiviant into contact with a strongly acidic cation-exchange resin to selectively adsorb heavy metals while allowing gold and iodine to pass therethrough. The process is particularly useful for purifying gold-bearing iodine lixiviant prior to recovering the gold by electrolysis.

13 Claims, 1 Drawing Sheet

PURIFICATION PROCESS FOR GOLD-BEARING IODINE LIXIVIANT

FIELD OF THE INVENTION

This invention relates to a purification process for a gold-containing iodine solution, or pregnant, gold-bearing iodine lixiviant, that results from the leaching of a gold-containing material with an iodine/iodide lixiviant solution. More particularly, the invention provides a process which involves purification of the gold-bearing iodine lixiviant produced by a lixivial process, such as in-situ, heap, vat, or agitated leaching, with a certain type of strongly acidic cation-exchange resin to facilitate subsequent recovery of gold and regeneration and recycling of the iodine lixiviant by electrolysis, thus making possible pollution-free, efficient recovery of gold.

BACKGROUND OF THE INVENTION

A cyanide process which employs cyanide as a complexing agent has been used exclusively for many years in, for example, hydrometallurgical recovery of gold from auriferous ores. However, the serious impacts of cyanide toxicity upon waste disposal and upon the environment have made it urgent to reconsider the process.

It has been proposed to use thiourea, sodium thiosulfate, or the like in place of cyanide as the gold complexing agent. These substitutes, however, if effective at all, make the treatment so much more costly that they have seldom come into practical use.

Chlorine was tried earlier, but its adoption was given up because of its strong corrosive attack and the consequent high treatment cost involved.

Lixiviating a gold-containing material with iodine to recover gold is well known in the art. For example, processes for recovering gold by lixiviation with an iodine/iodide solution are described in U.S. Patent Nos. 2,304,823, 3,957,505, and 4,557,759. These processes entail significant loss of expensive iodine and are not economically warranted.

A process for efficiently achieving both electrolytic recovery of gold and regeneration of iodine from gold-containing iodine solution leached with an aqueous solution containing elemental iodine and iodide ions, taking advantage of the oxidizing power of iodine and the gold-complexing action of the iodide ion, has been established. For details, refer to PCT Patent Application Publication No. 502358/1988 (International Publication No. WO87/03623). The process (hereinafter called the "iodine process") may be defined as: "A process for recovering gold by electrolysis from a pregnant, gold-bearing iodine lixiviant in which gold has been leached from a gold-containing material with an iodine/iodide lixiviant, while, at the same time, oxidizing a portion of the iodide ions in the lixiviant to regenerate iodine and recycle the lixiviant to the gold-leaching step."

To be more specific, the process comprises the steps of introducing the gold-bearing iodine lixiviant into the cathode compartment of an electrolytic cell, where gold is electrodeposited on the cathode, reducing iodine in the lixiviant substantially to iodide, and conducting the effluent solution from the cathode compartment into the anode compartment, where the iodide ions are oxidized for regeneration to elemental iodine.

The iodine process is attracting attention as an excellent method for gold recovery taking the place of the cyanide process and offers the following advantages:

(1) It has fewer deleterious effects upon the environment;

(2) Iodine in the lixiviant solution is stable in the form of a complex salt ($I_3^-$), and therefore, iodine loss during handling is minimized and the iodine concentration is easy to control;

(3) The resulting gold complex salt is highly stable; and (4) Regeneration of iodine permits recycling of the spent lixiviant solution, realizing low cost operation.

Gold-bearing materials normally contain substances other than gold which are leachable with iodine. For example, in auriferous ores, ferrous minerals such as pyrite and pyrrhotite usually occur. Even in scraps containing precious metals it is common that iron, copper, and the like, are present. When such a gold-containing material is leached with an iodine lixiviant solution, the proportion of the resulting heavy metal ions to the gold ions in the pregnant lixiviant is generally about equivalent to or several figures larger than the latter. It has been recognized that the pregnant lixiviant, if subjected without prior purification to simultaneous electrolytic recovery of gold and iodine regeneration for reuse of the lixiviant, would present the following problems:

(a) At the cathode of the electrolytic cell, electrolysis of part of the water takes place, making the cathode solution alkaline. Consequently, hydroxides of heavy metals other than gold are formed in the cathode compartment, and they interfere with the gold deposition onto the cathode.

(b) When the regenerated electrolyte, still containing the heavy metals, is reused in leaching gold from a fresh feed of gold-containing material, a substance unleachable with the iodine lixiviant solution tends to form on the surface of in the gold-containing material. If occurs, the leaching of gold could be hampered due to this passivation of the gold surface.

For wider use of the iodine process, the solution to these problems is imperative. In particular, it appears that there will be a growing requirement in the future for broadening the range of gold-containing materials to which gold recovery by the iodine process is applicable. To meet the requirement, it is important to eliminate the troubles that would arise from the presence of iron and other heavy metals.

In order to solve these problems, the present inventor has studied the following means:

(1) Adding a buffering agent such as potassium carbonate or sodium acetate to the iodine lixiviant solution in advance, to prevent the heavy metals in the gold-containing material, other than gold, from coming into solution.

(2) Forming precipitates of heavy metal hydroxides by the addition of an alkali the pregnant lixiviant containing heavy metals besides gold, and removing the precipitates from the lixiviant before being sent to the electrolysis step.

(3) Identifying an ion-exchange capable of selectively adsorbing heavy metals other than gold while allowing gold and iodine to pass therethrough, and then causing the pregnant lixiviant containing heavy metals besides gold to flow through the resin so that the heavy metals are removed before lixiviant is conducted to the electrolysis step.

Investigations by the present inventor have shown that approach (3) was the best means to solve the aforementioned problems with respect to feasibility. The approach (1) prevents the leaching of heavy metals other than gold to some extent but can hardly achieve perfect prevention, because the non-gold heavy metals occur in larger amounts than gold in the gold-containing materials. If the buffering agent is used in an amount large enough to avoid the leaching of the heavy metals, it also interferes with the leaching of gold, hampering the attainment of the objective of the process, i.e., the recovery of gold with the aid of iodine. Although heavy metals can be removed by approach (2), part of the gold-iodine complex precipitates together with hydroxides of the heavy metals. This necessitates the provision of an extra process step for the recovery of gold that has coprecipitated with the heavy metals, adding to the complexity of the process for gold recovery with iodine. Moreover, because the rates at which the precipitates are formed and are removed after concentration are much lower than the rates of gold leaching and electrolysis, the removal step slows down the overall speed of the iodine process for gold recovery.

In contrast to these two, the approach (3) makes it possible to remove heavy metals with substantially no deleterious effect upon the gold recovery process, provided an ideal ion-exchange resin for the purposes of the invention can be found.

Extensive investigations by the present inventor have now resulted in successful discovery of a cation-exchange resin which can pass gold and iodine, but selectively intercept and remove Fe ion and which lends itself to gold recovery by the iodine process. Styrenic, strongly acidic (strong-acid) cation-exchange resin meets the requirements. The styrenic, strongly acidic cation-exchange resin is commercially available, but has not previously been used for the above purpose.

SUMMARY OF THE INVENTION

The present invention provides a purification process for a gold-bearing iodine lixiviant in which the troubles ascribable to the presence of iron and other heavy metals are avoided.

On the basis of the above, the present invention provides a purification process for a gold-bearing iodine lixiviant. The process is characterized by bringing a pregnant, gold-bearing iodine lixiviant in which gold from a gold containing material (a gold-containing material also contains heavy metals such as iron.) has been leached with an iodine/iodide lixiviant, into contact with a styrenic, strongly acidic cation-exchange resin, thereby selectively adsorbing and removing the heavy metals such as iron from the lixiviant while allowing gold and iodine to pass through the resin. Embodiments of the invention include:

(1) A purification process for a gold-bearing iodine lixiviant in a process for recovering gold by electrolysis from a pregnant, gold-bearing iodine lixiviant in which gold has been leached from a gold-containing material which also contains heavy metals such as iron with an iodine/iodide lixiviant, characterized by bringing the pregnant lixiviant into contact with a styrenic, strongly acidic cation-exchange resin prior to the electrolysis, thereby selectively adsorbing and removing the heavy metals such as iron from the lixiviant while allowing gold and iodine to pass through the resin; and (2) A purification process for a gold-bearing iodine lixiviant in a process for recovering gold by electrolysis from a pregnant, gold-bearing iodine lixiviant in which gold has been leached from a gold-containing material which also contains heavy metals such as iron with an iodine/iodide lixiviant while, at the same time, oxidizing part of iodide ions in the pregnant, gold-bearing iodine lixiviant to regenerate iodine and recycle the lixiviant for gold recovery, characterized by bringing the pregnant lixiviant into contact with a styrenic, strongly acidic cation-exchange resin prior to the electrolysis, thereby selectively adsorbing and removing the heavy metals such as iron from the lixiviant while allowing gold and iodine to pass through the resin.

A particularly desirable process for simultaneous gold recovery and iodine retrieval involves a process which comprises introducing the pregnant, gold-bearing iodine lixiviant into the cathode compartment of an electrolytic cell, where gold is electrodeposited on the cathode electrode and iodine in the lixiviant is reduced substantially to iodide, and then conducting the effluent from the cathode compartment into the anode compartment where iodide ions are oxidized to regenerate iodine.

DETAILED DESCRIPTION OF THE INVENTION

Figure 1:
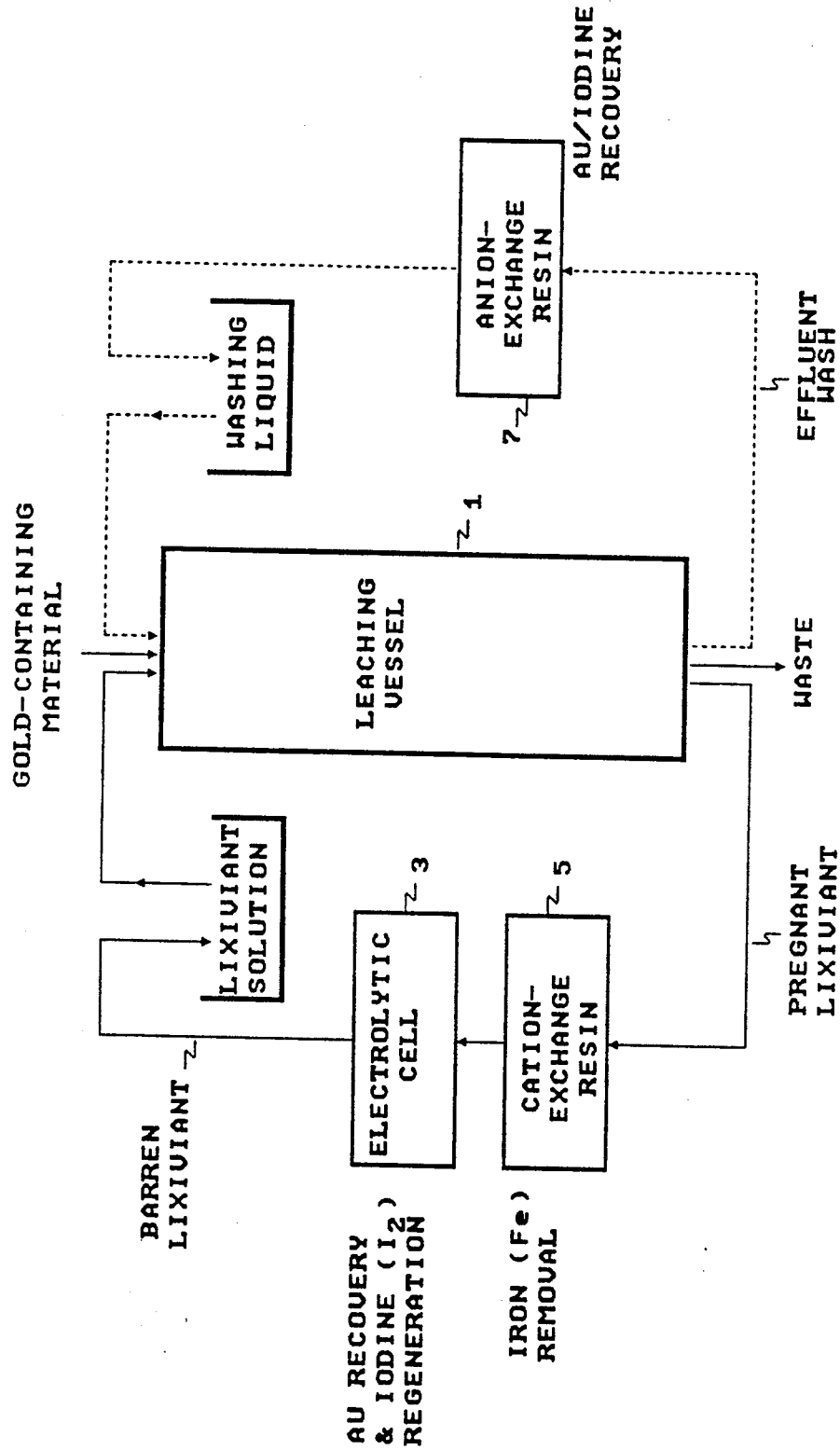
FIG. 1 is a flow sheet of a process for the iodine process incorporating the present invention.

The invention is applicable to all processes for purifying an iodine/iodide solution obtained by lixiviation of gold-containing materials which also contain heavy metals such as iron. In particular, the invention is useful for a process of electrolytically recovering gold from a pregnant, gold-bearing iodine lixiviant.

The invention is suited especially for the iodine process.

FIG. 1 is a flow sheet of a process for practicing the iodine process incorporating the present invention. In a leaching vessel 1 holding a gold-containing material, gold is leached with an iodine/iodide lixiviant solution. From the resulting pregnant, gold-bearing iodine lixiviant, gold is recovered by electrolysis in an electrolytic cell 3. Concurrently, part of the iodide ions in the pregnant, gold-bearing iodine lixiviant is oxidized to regenerate iodine so that the solution is recycled as the lixiviant for gold leaching. In the process, the pregnant lixiviant is passed, prior to the electrolysis, through a resin column 5 packed with a specific cation-exchange resin. The lixiviant is therein contacted with the resin, whereby gold and iodine are passed but heavy metals other than gold, such as iron, are selectively adsorbed by the resin and purification of the spent lixiviant is achieved.

The right hand loop of FIG. 1 indicates the purification system for the leach residue. After the leaching of a gold-containing material and after the removal of the pregnant lixiviant, the leach residue usually contains about 20% of the iodine originally fed and a concomitantly formed gold-iodine complex. Purification is effected to make the iodine-aided gold recovery process commercially practical. Illustrated in FIG. 1, for example, is a purification system using an anion-exchange resin.

Iodine is capable of ionizing gold and complexing the ionized gold. Where gold is leached using an aqueous solution of iodine and iodide ions, the dissolution of gold is presumed to proceed in accordance with the following equations:

$$I^- + I_2 = I_3^-  \quad (1)$$

$$2Au + I_3^- + I^- = 2AuI_2^- \quad (2)$$

$$2Au + 3I_3^- = 2AuI_4^- + I^- \quad (3)$$

The iodide used is a water-soluble iodide in the form of an alkali metal salt of iodine typified by sodium iodide or potassium iodide.

The total iodine concentration in the lixiviant solution is adjusted to the range of 1 to 20 grams/liter (g/l), preferably to the range of 2 to 5 g/l. The ratio by weight of the reduced iodine ($I^-$) to oxidized iodine ($I_2$) is desired to range from about 10:1 to about 1:10. A ratio of about 2:1 appears to be more economically desirable.

For the purposes of the invention, the term "gold-containing material" refers generically to any of various gold-bearing ores and metallic materials. The ores include any auriferous ores such as silicate ores and sulfidic ores and concentrates. The metallic materials include scraps of electronic devices and appliances and wastes and residues of refinery. Such a material is crushed and fed in granular form to a lixiviation vessel. To shorten the leaching time and increase the leaching rate, the granular material may be agglomerated. Leaching in a variety of ways falls within the scope of the present invention. For example, vat leaching uses a leaching vessel (vat) in which a lixiviant from a feeder installed above the vessel is uniformly sprinkled over, and into contact with, a bed of granulated ore laid on a perforated filter plate. Agitated leaching involves agitation by impellers or the like. Heap leaching consists of sprinkling a lixiviant solution over a heap of ores in open-air storage. In-place leaching comprises forming artificial fissures in an ore body and sprinkling a lixiviant over it through the fissures. The leaching bed in FIG. 1 is shown by way of example.

The electrolytic cell is partitioned, for example, by a cation-exchange membrane into cathode and anode compartments. The process with this cell comprises introducing a gold-bearing iodine lixiviant into the cathode compartment of the electrolytic cell, where gold is electrodeposited on a cathode of steel while, at the same time, iodine in the pregnant lixiviant is reduced substantially to iodide, and then conducting the effluent from the cathode compartment into the anode compartment equipped with an anode of, for example, graphite, where iodide ions are oxidized to regenerate iodine.

The present invention is characterized by a gold-bearing iodine lixiviant being brought into contact with a styrenic, strongly acidic cation-exchange resin to carry out, prior to electrolysis, the purification of the gold-bearing iodine lixiviant, whereby gold and iodine are allowed to pass whereas heavy metals other than gold, such as iron, are selectively adsorbed by the resin and removed.

Tables 1 and 2 summarize the results of adsorption tests conducted with several ion-exchange resins. The test liquids treated were artificially prepared solutions containing Au, Fe, and $I_2$ at the varying concentrations shown. The liquid flow rate per 10 cc resin was 3 cc/min.

It can be seen that "CHELATE I" and "CHELATE II", (trade designations for chelate-type ion-exchange fibers made by Nitivy Co., Ltd.) and "UNIE 30+ and "UNIE 50" (trade designations for chelate-type ion-exchange resins made by Unichika, Ltd.) exhibited no or only slight selectivity of iron from the ternary system. In contrast to these, styrenic, strongly acidic cation-exchange resins marketed under the trade names "AMBERLITE" (IR.120B) by Japan Organo Co., Ltd. and "DIAION" (SK 1B) by Mitsubishi Kasei Corp., behaved in substantially the same way. They allowed gold and iodine to pass while selectively adsorbing iron.

TABLE 1

(solution passage rate per 10 cc resin: 3 cc/min)

| Ion-Exchange Resin | Soln. pass. time (hr) | Treated Solution Au (ppm) | Fe (ppm) | $I_2$ (g/l) |
|---|---|---|---|---|
| Original Solution | 0 | 1.84 | 89.9 | 1.93 |
| "Chelate I" | 1 | <0.01 | <0.0 | 0.00 |
| | 2 | <0.01 | 15.7 | 0.00 |
| | 3 | 0.11 | 74.4 | 0.26 |
| | 4 | 0.88 | 102.0 | 1.70 |
| | 5 | 1.06 | 101.0 | 1.87 |
| "Chelate II" | 1 | 0.55 | 2.0 | 0.00 |
| | 2 | 0.64 | 3.1 | 0.26 |
| | 3 | 1.64 | 76.5 | 1.62 |
| | 4 | 1.89 | 76.4 | 1.79 |
| | 5 | 1.96 | 92.5 | 1.87 |
| "Unie 30" | 1 | 0.84 | 0.3 | 0.51 |
| | 2 | 1.61 | 0.1 | 1.11 |
| | 3 | 1.88 | 0.4 | 1.36 |
| | 4 | 1.89 | 0.2 | 1.44 |
| | 5 | 2.04 | 0.4 | 1.53 |
| "Unie 50" | 1 | 0.31 | <0.1 | 0.17 |
| | 2 | 0.98 | <0.1 | 0.72 |
| | 3 | 1.84 | <0.1 | 1.11 |
| | 4 | 1.79 | 0.2 | 1.45 |
| | 5 | 1.82 | <0.1 | 1.62 |
| "Amberlite" (IR-120 B) | 1 | 1.61 | <0.1 | 1.68 |
| | 2 | 2.02 | <0.1 | 1.87 |
| | 3 | 2.02 | <0.1 | 1.87 |
| | 4 | 1.85 | <0.1 | 1.87 |
| | 5 | 1.69 | <0.1 | 1.87 |

TABLE 2

(solution passage rate per 10 cc resin: 3 cc/min)

| Ion-Exchange Resin Solution | "Amberlite" (IR-120B) Treated Solution | | | "DIAION" (SK-1B) Treated Solution | | |
|---|---|---|---|---|---|---|
| Passage Time (hr) | Au (ppm) | Fe (ppm) | $I_2$ (g/l) | Au (ppm) | Fe (ppm) | $I_2$ (g/l) |
| Original Solution | 2.12 | 101.2 | 1.99 | 2.08 | 81.7 | 2.04 |
| 1 hr | 1.89 | <0.1 | 1.53 | 1.83 | 0.3 | 1.45 |
| 2 hr | 2.09 | <0.1 | 1.79 | 1.86 | 0.4 | 1.79 |
| 3 hr | 2.05 | <0.1 | 1.88 | 1.96 | 0.2 | 1.87 |
| 4 hr | 2.25 | <0.1 | 1.91 | 1.91 | 0.6 | 1.87 |

In other series of tests, "DIAION (SK.1B)" showed similar properties with respect to copper and manganese, as well as to iron. The results are given in Table 3.

TABLE 3

| Solution Passage Time (hr) | Treated Solution 1 | | | Treated Solution 2 | | |
|---|---|---|---|---|---|---|
| | Au (ppm) | Cu (ppm) | $I_2$ (g/l) | Au (ppm) | Mn (ppm) | $I_2$ (g/l) |
| Original Solution | 2.04 | 94.3 | 2.01 | 1.98 | 102.5 | 2.10 |
| 1 | 1.84 | <0.1 | 1.58 | 1.77 | 0.2 | 1.67 |
| 2 | 1.98 | <0.1 | 1.82 | 1.88 | 0.3 | 1.87 |
| 3 | 2.00 | 0.2 | 1.92 | 1.93 | 0.2 | 1.95 |
| 4 | 2.08 | 0.1 | 1.95 | 1.94 | 0.4 | 2.03 |

Styrenic, strongly acidic cation-exchange resins have a sulfonic group (—SO$_3$H) as the exchange group. Commercial grades such as shown above, generally known and handled as Na-type (—SO$_3$Na), are commercially available.

As briefly referred to above in connection with the purification system, it is by the use of a strongly basic (strong-base) anion-exchange resin that gold is effectively recovered from the solution containing a low concentration of a gold-iodine complex that results from the purification of the leach residue after the leaching of gold from a gold-containing material with iodine. After the gold-iodine complex has been recovered by adsorption in the manner described, the gold is desorbed, preferably by the process described in the applicant's co-pending application filed on the same date as the present application. The process according to the co-pending application is one for desorbing a gold-iodine complex from a strongly basic anion-exchange resin, which comprises adding sulfuric acid and sodium nitrite to the complex on the resin and then adding sodium sulfite as a desorbing agent. The invention utilizes a strongly basic anion-exchange resin which is capable of adsorbing a gold-iodine complex in the adsorption and recovery of the gold-iodine complex and further incorporates a process step of treating the gold-iodine complex in advance on the resin to a state in which it can be more easily eluted before the introduction of an eluant, thus successfully desorbing gold with ease. The procedure, when combined with the present invention, renders it possible to realize an efficient gold recovery process.

The advantageous effects of the invention are demonstrated below by an example of the invention and a comparative example.

EXAMPLE

Five hundred kilograms of raw ore sample from a mine in Japan with a gold content of 2.4 grams/ton (g/t) was crushed to a grain size such that grains 10 millimeter or smaller in diameter made up 50% of the total weight. The grains were agglomerated and placed in a leaching column. A lixiviant solution containing 2.0 g iodine per liter and 9.6 g sodium iodide per liter was supplied to the leaching column. After passage through the ore, the pregnant lixiviant was passed through a column packed with a styrenic, strongly acidic cation-exchange resin (marketed under the trade designation "DIAION (SK-1B)", ionic type being Na form, by Mitsubishi Kasei Corp.). Electrolytic treatment permitted gold recovery and iodine regeneration. In this way recycling of the lixiviant was carried out. Forty hours of leaching made possible gold recovery at the high percentage of 78.8.

In the lixiviant immediately after effluence from the ore, the gold concentration was 2.5 to 3.0 ppm and the iron concentration 80 to 120 ppm. After passage through the ion-exchange resin, the gold concentration remained practically unchanged while the iron concentration dropped to 0.2 ppm or less. Iodine loss in the spent lixiviant was 1% or less.

COMPARATIVE EXAMPLE

A lixiviant solution containing 2.0 g iodine per liter and 9.6 g sodium iodide per liter was supplied to 15 kg of the same ore as used in the example of the invention. After passage through the ore, the pregnant lixiviant, with gold leached, was directly electrolyzed to recover gold and regenerate iodine. Thus, recycling of the lixiviant was continued. Several hours after the start of the test, a phenomenon occurred in which gold leaching faltered. Eight hours later the leaching came to a conclusion, and the gold recovery percentage was only 30.2%. At the cathode of the electrolytic cell, a voluminous concentration of hydroxide precipitates of heavy metals such as iron was observed.

As described hereinbefore, the process of the invention for gold recovery with iodine renders it possible to effectively lixiviate and recover gold even from gold-containing materials which also contains heavy metals that can be leached out with iodine. The present invention is considered very contributory to the progress of the industry concerned since it broadens the scope of the gold-containing materials to which the gold recovery technology using the iodine process is applicable.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

I claim:

1. A process for the purification of a gold-bearing iodine lixiviant comprising the step of contacting a pregnant, gold-bearing iodide lixiviant in which gold has been leached from a gold-containing material with a styrenic, strongly acidic cation-exchange resin, to selectively absorb and remove heavy metals from the lixiviant while allowing gold and iodine to pass through the resin.

2. A process for the purification of a gold-bearing iodine lixiviant in a process for recovering gold by electrolysis from a pregnant, gold-bearing iodine lixiviant in which gold has been leached from a gold-containing material which also contains heavy metals with an iodine/iodide lixiviant, comprising the step of contacting the pregnant lixiviant with a styrenic, strongly acidic cation-exchange resin prior to the electrolysis, thereby selectively adsorbing and removing the heavy metals from the lixiviant while allowing gold and iodine to pass through the resin.

3. A purification for a gold-bearing iodine lixiviant in a process for recovering gold by electrolysis from a pregnant, gold-bearing iodine lixiviant in which gold has been leached from a gold-containing material which also contains heavy metals with an iodine/iodide lixiviant while, at the same time, oxidizing part of iodide ions in the pregnant, gold-bearing iodine lixiviant to regenerate iodine and recycle the lixiviant for gold recovery, comprising the step of contacting the pregnant lixiviant with a styrenic, strongly acidic cation-exchange resin prior to the electrolysis, thereby selectively adsorbing and removing said heavy metals from the lixiviant while allowing gold and iodine to pass through the resin.

4. A process according to claim 3 wherein the process for simultaneous gold recovery and iodine retrieval comprises introducing the pregnant, gold-bearing iodine lixiviant into the cathode compartment of an electrolytic cell, where gold is electrodeposited on the cathode electrode and iodine in the lixiviant is reduced substantially to iodide, and then conducting the effluent from the cathode compartment into the anode compartment where iodide ions are oxidized to regenerate iodine.

5. A process according to any one of claims 1 to 3 wherein said gold-containing material is selected from the group consisting of gold-bearing ores, scraps of electronic devices and appliances, and wastes and residues of refinery.

6. A process according to claim 5 wherein said gold-bearing ores are selected from the group consisting of silicate ores and sulfidic ores and concentrates.

7. A process according to any one of claims 1 to 3 wherein said iodide is a water-soluble iodide in the form of an alkali metal salt of iodine.

8. A process according to any one of claims 1 to 3 wherein total iodine concentration in the lixiviant solution is adjusted to the range of 1.20 g/l.

9. A process for the purification of a gold-containing iodine lixiviant comprising the step of contacting said gold-containing iodine lixiviant with a material that selectively removes substantially all heavy metal impurities from the solution while allowing substantially all of said gold to pass therethrough.

10. A process as recited in claim 9, wherein said material comprises styrenic, strongly acidic cation exchange resin.

11. A process as recited in claim 9, wherein said heavy metals are selected from the group consisting of iron, copper, manganese and mixtures thereof.

12. A process for the recovery of gold from a gold-bearing ore comprising the steps of:
  a) leaching said gold-bearing ore with a lixiviant comprising iodine to form a gold-containing iodine lixiviant;
  b) contacting said gold-bearing iodine lixiviant with a styrenic, strongly acidic cation exchange resin to selectively remove substantially all heavy metal impurities from said gold-containing iodine lixiviant; and
  c) recovering gold from said gold-containing iodine lixiviant by an electrolytic process.

13. A process as recited in claim 12 wherein said heavy metals are selected from the group consisting of iron, copper, manganese, and mixtures thereof.

* * * * *